United States Patent
Park et al.

(10) Patent No.: US 10,250,297 B2
(45) Date of Patent: Apr. 2, 2019

(54) SYSTEM AND METHOD OF PROVIDING A SERVICE USING A NEAR FIELD COMMUNICATION TAG

(71) Applicant: Samsung Electronics Co., Ltd., Gyeonggi-do (KR)

(72) Inventors: Kyong-ha Park, Gyeonggi-do (KR); Hyun-su Hong, Gyeonggi-do (KR); Kwang-yong Lee, Seoul (KR); Moon-joo Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/728,469

(22) Filed: Dec. 27, 2012

(65) Prior Publication Data

US 2013/0171932 A1  Jul. 4, 2013

(30) Foreign Application Priority Data

Jan. 3, 2012 (KR) .................. 10-2012-0000650

(51) Int. Cl.
*H04B 5/00* (2006.01)
*G01C 21/20* (2006.01)
(Continued)

(52) U.S. Cl.
CPC ......... *H04B 5/0031* (2013.01); *G01C 21/206* (2013.01); *H04W 4/80* (2018.02); *H04W 4/02* (2013.01)

(58) Field of Classification Search
USPC ....................................... 455/41.1
See application file for complete search history.

(56) References Cited

U.S. PATENT DOCUMENTS 8,258,953 B2 * 9/2012 Stern et al. ................ 340/572.1
8,364,173 B2 1/2013 Mattila et al.
(Continued)

FOREIGN PATENT DOCUMENTS

| CN | 101458700 | 6/2009 |
|---|---|---|
| CN | 102197664 | 9/2011 |

(Continued)

OTHER PUBLICATIONS

Francisco Borrego-Jaraba et al., "NFC Solution for the Development of Smart Scenarios Supporting Tourism Applications and Surfing in Urban Environments," Trends in Applied Intelligent Systems, Springer Berlin Heidelberg, vol. 6098, Jun. 1, 2010, pp. 229-238.*

(Continued)

*Primary Examiner* — Nay A Maung
*Assistant Examiner* — Erica L Fleming-Hall
(74) *Attorney, Agent, or Firm* — The Farrell Law Firm, P.C.

(57) ABSTRACT

A system and method of providing a service using a Near Field Communication (NFC) tag are provided. A device that receives the service includes a tag information receiving unit that receives tag information from the NFC tag; a service requesting unit that provides a server with application information about an application that is installed in the device and the tag information, and that requests a service corresponding to the application; and a data receiving unit that receives service data from the server. The service data corresponds to the application information and the tag information and differs from each other, according to a type of the application.

17 Claims, 5 Drawing Sheets

(51) Int. Cl.
*H04W 4/80* (2018.01)
*H04W 4/02* (2018.01)

(56) References Cited

U.S. PATENT DOCUMENTS

| | | | |
|---|---|---|---|
| 8,737,619 B2 | 5/2014 | Olsson et al. | |
| 2004/0051644 A1* | 3/2004 | Tamayama et al. | 340/686.1 |
| 2006/0095540 A1* | 5/2006 | Anderson | H04N 1/00281 709/217 |
| 2008/0137912 A1* | 6/2008 | Kim et al. | 382/106 |
| 2008/0238617 A1* | 10/2008 | Kuhl | G06K 19/0723 340/10.1 |
| 2009/0157304 A1 | 6/2009 | Zhe et al. | |
| 2009/0203367 A1* | 8/2009 | Pamminger | G06Q 30/00 455/414.3 |
| 2010/0295943 A1* | 11/2010 | Cha | G01S 13/82 348/143 |
| 2011/0012715 A1* | 1/2011 | Eschenauer | G06Q 10/06 340/10.42 |
| 2011/0165859 A1 | 7/2011 | Wengrovitz | |
| 2011/0169729 A1* | 7/2011 | Holleis | G06F 3/0346 345/156 |
| 2011/0182250 A1 | 7/2011 | Shin et al. | |
| 2011/0211563 A1* | 9/2011 | Herrala et al. | 370/338 |
| 2011/0258443 A1* | 10/2011 | Barry | H04L 9/3247 713/168 |
| 2011/0267179 A1* | 11/2011 | Patterson | 340/286.02 |
| 2011/0276570 A1* | 11/2011 | Larsson | G06Q 30/02 707/736 |
| 2011/0276961 A1* | 11/2011 | Johansson | G06F 8/61 717/178 |
| 2011/0302264 A1* | 12/2011 | Lawrence | G06Q 10/087 709/207 |
| 2012/0075068 A1* | 3/2012 | Walker et al. | 340/10.1 |
| 2012/0077593 A1* | 3/2012 | Sarmenta | A63F 13/327 463/40 |
| 2012/0092134 A1* | 4/2012 | Stern et al. | 340/10.1 |
| 2012/0101885 A1* | 4/2012 | Lee | G06Q 20/3278 705/14.23 |
| 2012/0158297 A1* | 6/2012 | Kim et al. | 701/516 |
| 2012/0239499 A1* | 9/2012 | Zughaib | G06Q 30/02 705/14.58 |
| 2013/0040561 A1* | 2/2013 | Conde e Silva | H04W 4/008 455/41.1 |
| 2013/0149962 A1* | 6/2013 | Kim et al. | 455/41.1 |
| 2013/0247117 A1* | 9/2013 | Yamada et al. | 725/93 |
| 2018/0124569 A1* | 5/2018 | Shin | H04W 4/023 |

FOREIGN PATENT DOCUMENTS

| | | | | |
|---|---|---|---|---|
| EP | 2 378 451 | | 10/2011 | |
| EP | 2525297 A1 | * | 11/2012 | ....... G06F 17/30879 |
| KR | 1020080100908 | | 11/2008 | |
| KR | 1020090093431 | | 9/2009 | |
| KR | 1020100127282 | | 12/2010 | |

OTHER PUBLICATIONS

Tuomo Tuikka, "Touch the Future with a Smart Touch," Jan. 1, 2009, pp. 245-251.*
Chinese Office Action dated Nov. 12, 2015 issued in counterpart application No. 201310003301.5, 17 pages.
Borrego-Jaraba et al., "NFC Solution for the Development of Smart Scenarios Supporting Tourism Applications and Surfing in Urban Environments", Trends in Applied Intelligent Systems, Jun. 1, 2010.
Tuikka et al., "Touch the Future with a Smart Touch", VTT Research Notes 2492, Jan. 1, 2009.
Takashima, "Draft of New Recommendation H.mid 'Tag-based ID Triggered Multimedia Information Delivery System Architecture'", Study Group 16 TD 510 (WP 2/16), International Telecommunication Union, Telecommunication Standardization Sector, Study Period 2005-2008, Jul. 19, 2007.
Lou et al., "Network Architecture and Services Supporting Cross Media NFC Applications", Jan. 1, 2008.
Kim et al., "Review Report of Standardization Issues on Network Aspects of Identification including RFID", Study Group 17-Delayed Contribution 155, COM 17-D 155-E, International Telecommunication Union, Telecommunication Standardization Sector, Study Period 2005-2008, Apr. 19, 2006.
Korean Office Action dated Nov. 12, 2018 issued in counterpart application No. 10-2012-0000650, 10 pages.

* cited by examiner

| TAG ID | LOCATION VALUE |
|---|---|
| aaa | ROOM NUMBER 503 IN KYOBO BUILDING |
| aab | THE DABOTAP PAGODA IN THE TEMPLE OF BULGUKSA |
| aac | HAEWOONDAE BEACH |
| ... | ... |

| APPLICATION | SERVICE |
|---|---|
| A | MAP INFORMATION PROVIDING SERVICE |
| B | ALBUM MANAGEMENT SERVICE |
| C | IMAGE-CAPTURING SERVICE |
| D | MEMO MANAGEMENT SERVICE |
| ... | ... |

FIG. 7
< HAEWOONDAE BEACH >
        2011. 8. 1 x x x x x
        2011. 8. 2 x x x x x
        2011. 9.10 x x x x x
FIG. 8
< THE DABOTAP PAGODA IN THE TEMPLE OF BULGUKSA >
 
2011.5.3    2011.8.10
 
2011.8.10   2011.8.10

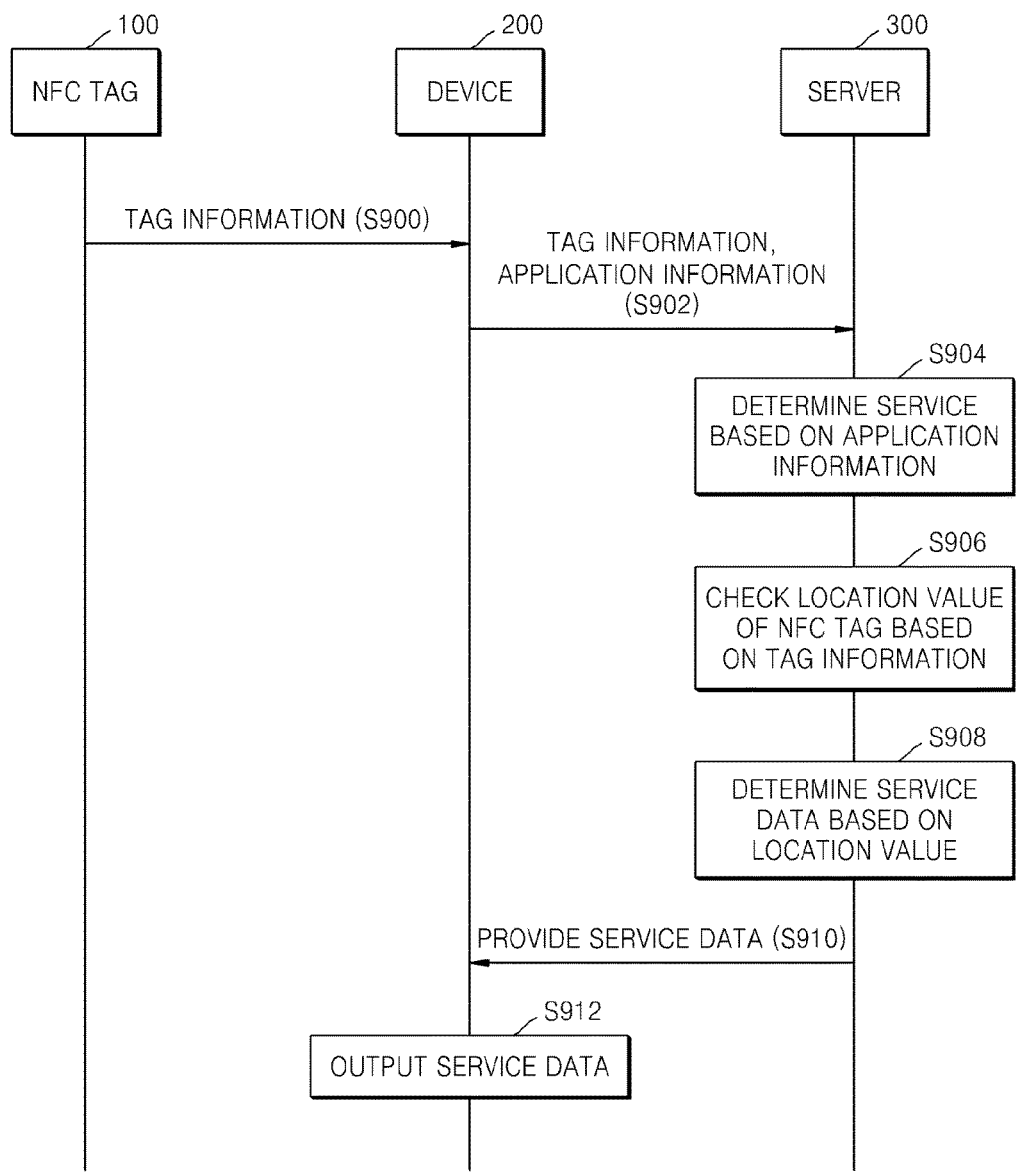

SYSTEM AND METHOD OF PROVIDING A SERVICE USING A NEAR FIELD COMMUNICATION TAG

PRIORITY

This application claims priority under 35 U.S.C. § 119(a) to Korean Patent Application No. 10-2012-0000650, which was filed in the Korean Intellectual Property Office on Jan. 3, 2012, the entire disclosure of which is incorporated herein by reference.

BACKGROUND OF THE INVENTION

1. Field of the Invention

The present invention relates generally to a system and method of providing a service using a Near Field Communication (NFC) tag, and more particularly, to a system and method of providing a location-based service using tag information provided from an NFC tag.

2. Description of the Related Art

In general, NFC is a type of Radio Frequency IDentification (RFID) technology that utilizes contactless near field wireless communication through which a device, e.g., a mobile phone, a smart phone, a Personal Digital Assistant (PDA), a notebook, etc., and transceives data within a distance of 10 cm using low power and a predetermined frequency band.

According to the related art, a location of a device may be tracked using a Global Positioning System (GPS) receiver included therein, using a location of a base station configuring a wireless communication network, or using a cell location of the base station. However, because a conventional device only receives information about a location from a GPS or a wireless communication network, the conventional device may not be provided services according to exact location values including a room number in a building, a name of a famous local place, etc. Further, it is difficult for the conventional device to obtain its exact location value and to be provided services that vary according to the obtained location value.

SUMMARY OF THE INVENTION

Accordingly, the present invention is designed to address at least the problems and/or disadvantages described above and to provide at least the advantages described below.

An aspect of the present invention is to provide a system and method that effectively provide a location-based service using an NFC tag.

Another aspect of the present invention is to provide a system and method that provide a service by using an NFC tag, wherein a detailed location of the NFC tag can be checked, based on tag information received from the NFC tag.

Another aspect of the present invention is to provide a system and method that provide different location-based services with respect to a plurality of applications using an NFC tag.

In accordance with an aspect of the present invention, a device is provided that receives a service by using an NFC tag. The device includes a tag information receiving unit that receives tag information from the NFC tag; a service requesting unit that provides a server with application information about an application that is installed in the device and the tag information, and that requests a service corresponding to the application; and a data receiving unit that receives service data from the server. The service data corresponds to the application information and the tag information and differs from each other, according to a type of the application.

In accordance with another aspect of the present invention, a server that provides a service by using an NFC tag is provided. The server includes a service request receiving unit that receives, from a device, tag information and application information about an application installed in the device; a service determining unit that determines a service to be provided to the device, based on the application information; a service data determining unit that determines service data for the service to be provided to the device, based on the tag information; and a service providing unit that provides the service data to the device.

In accordance with another aspect of the present invention, a method is provided for receiving a service using an NFC tag. The method includes receiving, by a device, tag information from the NFC tag; transmitting a request for a service corresponding to an application that is installed in the device, the request including application information about the application that is installed in the device and the tag information; and receiving, from the server, service data corresponding to the application information and the tag information. The service data differs from another service data according to a type of the application.

In accordance with another aspect of the present invention, a method of providing a service by using an NFC tag is provided. The method includes receiving, from a device, tag information and application information about an application installed in the device; determining a service to be provided to the device, based on the application information; determining service data for the service to be provided to the device, based on the tag information; and transmitting the service data to the device.

In accordance with another aspect of the present invention, a computer-readable recording medium is provided, which has recorded thereon, a program, which when executed, controls a device to perform a method of receiving a service using an NFC tag. The method includes receiving tag information from the NFC tag; transmitting a request for a service corresponding to an application that is installed in the device, the request including application information about the application that is installed in the device and the tag information; and receiving, from the server, service data corresponding to the application information and the tag information. The service data differs from another service data according to a type of the application.

BRIEF DESCRIPTION OF THE DRAWINGS

The above and other aspects, features, and advantages of certain embodiments of the present invention will become more apparent from the following description, with reference to the attached drawings, in which:

FIG. 7 illustrates an example of service data that is provided via a memo management service, according to an embodiment of the present invention;

FIG. 8 illustrates an example of service data that is provided via an album management service, according to an embodiment of the present invention; and FIG. 9 is a signal flow diagram illustrating a method of providing a service using an NFC tag, according to an embodiment of the present invention.

DETAILED DESCRIPTION OF EMBODIMENTS OF THE INVENTION

Various embodiments of the present invention will now be described more fully below with reference to the accompanying drawings. The present invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. In the following description, well-known functions or constructions are not described in detail so as not to obscure the invention with unnecessary detail.

Throughout the specification, a service that is provided from a server to a device includes a service that provides predetermined information with respect to the device and another service that manages data generated in the device. Examples of the services include a map information providing service, an album providing service, an image-capturing service, and a memo information managing service.

Figure 1:
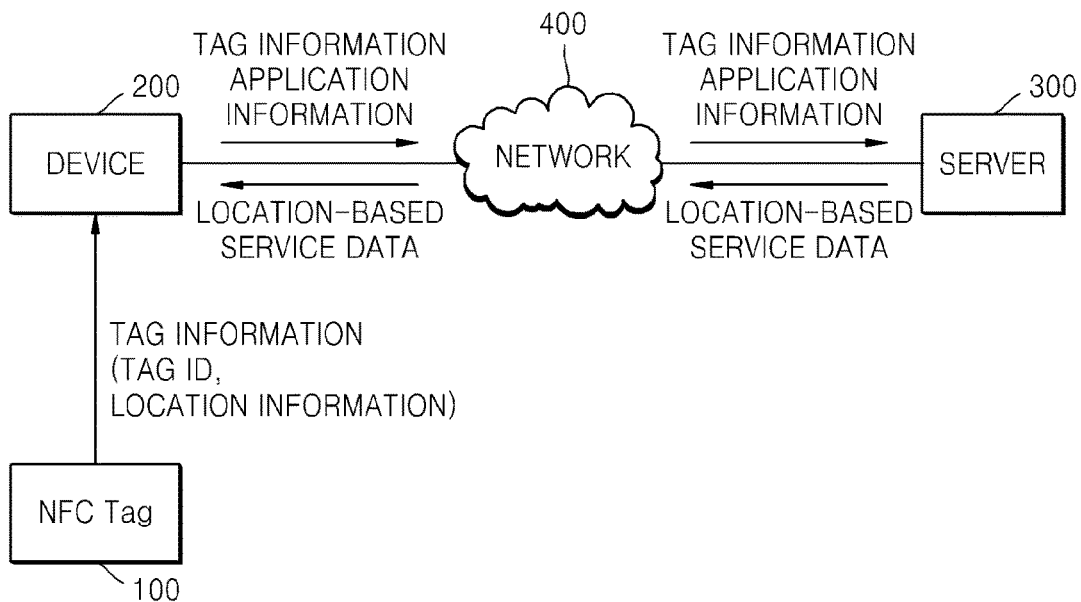
FIG. 1 illustrates a system for providing a service by using an NFC tag according to an embodiment of the present invention.

FIG. 1 illustrates a system for providing a service by using an NFC tag according to an embodiment of the present invention.

Referring to FIG. 1, the system includes the NFC tag 100, a device 200, a server 300, and a network 400. When a user carrying the device 200 approaches the NFC tag 100, the device 200 receives tag information from the NFC tag 100. For example, the tag information includes at least one of a tag ID and tag location information, and the NFC tag 100 may be attached to a fixed body in a location such as a building, a famous local place, a cultural asset, etc.

Thereafter, the device 200 may provide the server 300 with the received tag information and information about an application installed in the device 200, and may request the server 300 to provide a service that corresponds to the tag information and the application. For example, the device 200 may provide the server 300 with information about an application that is executed in the device 200. The device 200 includes all types of terminals capable of exchanging information with the server 300 and the NFC tag 100 via wired and wireless communications.

The server 300 determines a service and service data to be provided to the device 200, based on the tag information and the application information received from the device 200. The server 300 may determine a type of the service to be provided to the device 200, based on the application information. Also, the server 300 may check a location value of the NFC tag 100 based on the tag information, and may determine the service data to be provided to the device 200, by using the location value of the NFC tag 100.

The network 400 may be implemented as a wired network including a Local Area Network (LAN), a Wide Area Network (WAN), and a Value Added Network (VAN), or a wireless network including a mobile radio communication network and a satellite communication network. The network 400 collectively indicates data communication networks that allow network configuring elements illustrated in FIG. 1 to communicate without a problem, and includes wired internet, wireless internet, and a mobile wireless communication network.

Although it may be difficult for the device 200 to receive a GPS value via a sensor or to check a detailed location value of a location where the device 200 is located, in accordance with an embodiment of the present invention, the device 200 will effectively receive application service data about the location where the device 200 is located, using the NFC tag 100.

Figure 2:
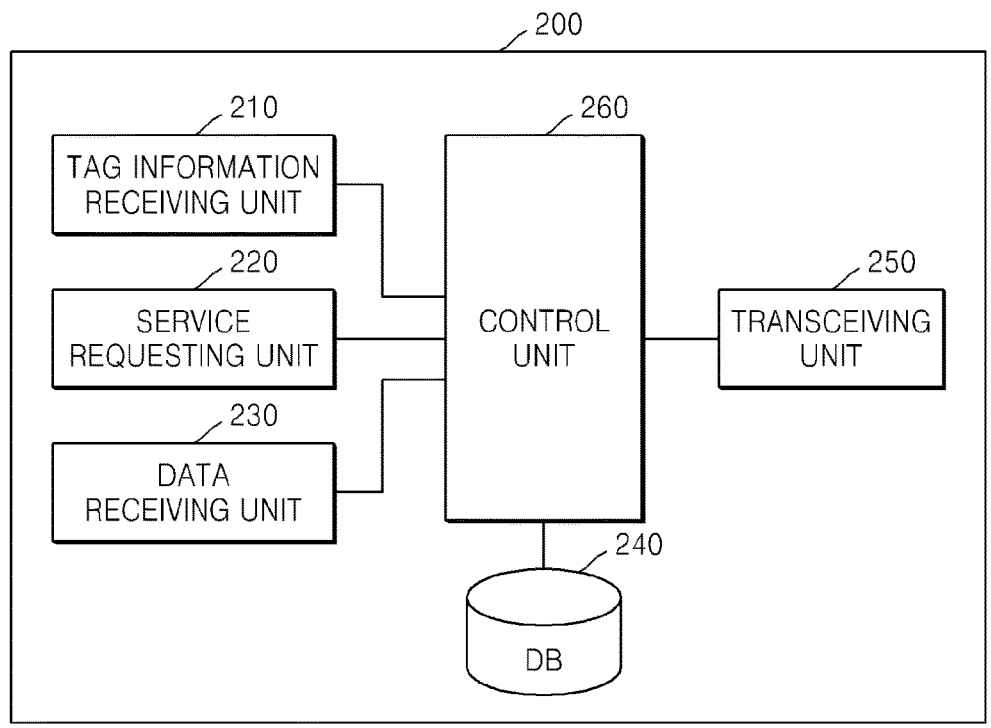
FIG. 2 illustrates a device according to an embodiment of the present invention.

FIG. 2 illustrates a device according to an embodiment of the present invention.

Referring to FIG. 2, the device 200 includes a tag information receiving unit 210, a service requesting unit 220, a data receiving unit 230, a DataBase (DB) 240, a transceiving unit 250, and a control unit 260. Herein, the term "unit" refers to a hardware device or a combination of software and a hardware device.

The tag information receiving unit 210 receives tag information from the NFC tag 100, when the NFC tag 100 is within a predetermined range. For example, the tag information includes at least one of a tag ID and tag location information, and the tag location information includes at least one of an address, a name of a local place, a name of a building, a floor level of a building, and a room number. The tag location information may include a GPS value of a location of the NFC tag 100.

The NFC tag 100 may be attached to a fixed body in a location such as a building, a famous local place, a cultural asset, etc., and the tag information receiving unit 210 may receive the tag location information about the location where the NFC tag 100 is located from the NFC tag 100.

The service requesting unit 220 requests the server 300 to provide service data to be output by an application in the device 200. The service requesting unit 220 provides the tag information and application information to the server 300 and requests the server 300 to provide a service related to the application. The service requesting unit 220 checks the application that is installed and executed in the device 200 and provides information about the checked application to the server 300. For example, the application information includes information about at least one of a title, an ID, a type, and a manufacturer of the application.

The service requesting unit 220 may provide the server 300 with data that is generated by the application. In this case, the server 300 matches the data with the tag information and then stores the data. For example, when an application that provides an image-capturing service is executed in the device 200 and a target object is captured by the application, the service requesting unit 220 provides the server 300 with the tag information and a captured image. The server 300 checks a location value corresponding to the tag information, matches the location value with the captured image, and then may store them.

The data receiving unit 230 receives the service data related to the application from the server 300. More specifically, the data receiving unit 230 receives the tag information and the service data corresponding to the application from the server 300, and then different types of service data with respect to different applications may be provided, based on the location value that is checked via the tag information.

For example, when an application that provides a map service is executed in the device 200 and a location value that corresponds to a tag ID indicates the Dabotap pagoda in the temple of Bulguksa, detailed map data within a preset range from the Dabotap pagoda is provided to the data receiving unit 230.

As another example, when an application that provides an album service is executed in the device 200 and a location value that corresponds to a tag ID indicates Haeundae beach, data about images that are captured at Haeundae beach are provided to the data receiving unit 230.

As another example, when an application that provides a memo service is executed in the device 200 and a location value that corresponds to a tag ID indicates room number 503 in the Kyobo building, memo information that was input in room number 503 in Kyobo building may be provided to the data receiving unit 230.

Accordingly, the data receiving unit 230 receives different service data according to application types and tag locations from the server 300.

The DB 240 stores various types of information for the device 200.

The transceiving unit 250 transmits and receives various types of information to and from the server 300. For example, the transceiving unit 250 provides the tag information and the application information to the server 300 and receives the service data from the server 300.

The control unit 260 controls the overall operation of the device 200, and in more detail, the control unit 260 controls the tag information receiving unit 210, the service requesting unit 220, the data receiving unit 230, the DB 240, and the transceiving unit 250 to receive the service data from the server 300 using the NFC tag 100.

Figures 3, 4:
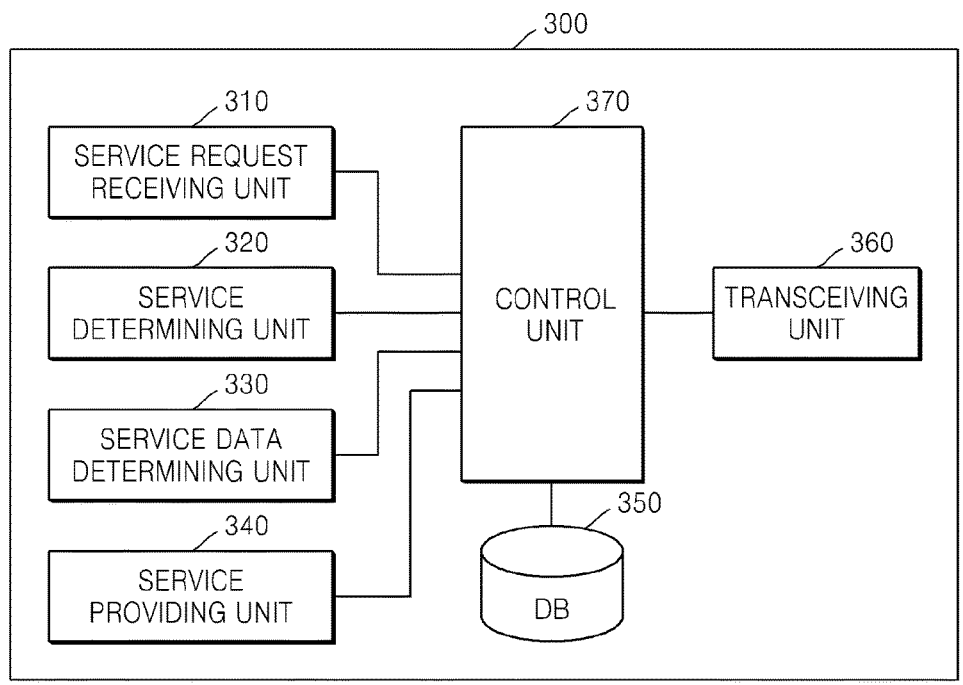
FIG. 3 illustrates a server according to an embodiment of the present invention.
FIG. 4 illustrates an example of a location information table according to an embodiment of the present invention.

FIG. 3 illustrates a server according to an embodiment of the present invention.

Referring to FIG. 3, the server 300 includes a service request receiving unit 310, a service determining unit 320, a service data determining unit 330, a service providing unit 340, a DB 350, a transceiving unit 360, and a control unit 370.

The service request receiving unit 310 receives a request for service data from the device 200. For example, the service request receiving unit 310 receives tag information about the NFC tag 100 and application information from the device 200. Additionally, the service request receiving unit 310 may receive data, which is generated by an application in the device 200, from the device 200. In this case, the service request receiving unit 310 matches the data with the tag information and stores them in the DB 350.

For example, when an application that provides an image-capturing service is executed in the device 200 and a target object is captured by the application, the service request receiving unit 310 receives the tag information and a captured image from the device 200. Thereafter, the service request receiving unit 310 checks a location value corresponding to the tag information, matches the location value with the captured image, and stores a plurality of pieces of matched data that differ from each other according to applications and services, respectively.

As indicated above, the tag information may include at least one of a tag ID and tag location information, and the tag location information may include at least one of an address, a name of a local place, a name of a building, a floor level of a building, and a room number. Further, the tag location information may include a GPS value of a location of the NFC tag 100, and the application information may include information about at least one of a title, an ID, a type, and a manufacturer of the application that is executed in the device 200.

The service determining unit 320 determines a service to be provided to the device 200, according to the application information. For example, the service determining unit 320 distinguishes between applications according to titles or IDs of the applications, and determines the services to be provided to the device 200, wherein the services are matched to the distinguished applications, respectively. The server 300 may also determine a service to be provided to the device 200, wherein the service provides data to be output by the application. For example, the service determining unit 320 may determine a service, such as a map providing service, an album service, a memo service, or an image-capturing service, as the service to be provided to the device 200.

The service data determining unit 330 determines service data to be provided to the device 200, based on the tag information and the application information. When the tag information indicates the tag ID, the service data determining unit 330 checks the location value that is matched with the tag ID, and determines the service data to be provided to the device 200, based on the checked location value. For example, the location value matched with the tag ID includes at least one of an address, a name of a local place, a name of a building, a floor level of a building, and a room number.

When the tag information includes a location value of the NFC tag 100, the service data determining unit 330 checks the location value of the NFC tag 100 from the tag information and determines service data to be provided to the device 200, according to the checked location value.

For example, when an application that is executed in the device 200 provides a map service, the service data determining unit 330 may determine detailed map data as the service data to be provided to the device 200, wherein the detailed map data is within a preset range from a location of the NFC tag 100.

As another example, when an application that is executed in the device 200 provides an album service, the service data determining unit 330 may determine image data as the service data to be provided to the device 200, wherein the image data is captured and stored within a preset range from the location of the NFC tag 100.

As another example, when an application that is executed in the device 200 provides a memo service, the service data determining unit 330 may determine memo data as the service data to be provided to the device 200, wherein the memo data is written within a preset range from the location of the NFC tag 100.

The service providing unit 340 provides the determined service data to the device 200. The service data provided to the device 200 is output by the application that is executed in the device 200.

The DB 350 stores various types of information for the server 300 to operate.

The transceiving unit 360 transmits and receives various types of information to and from the device 200.

The control unit 370 controls the overall operation of the server 300, and in more detail, the control unit 370 controls the service request receiving unit 310, the service determining unit 320, the service data determining unit 330, the service providing unit 340, the DB 350, and the transceiving unit 360 sto determine the services and the service data to be provided to the device 200, according to the tag information and the application information, and to provide the determined service data to the device 200.

FIG. 4 illustrates an example of a location information table according to an embodiment of the present invention.

Referring to FIG. 4, the location information table includes a tag ID field 40 and a location value field 42. The tag ID field 40 includes an ID of the NFC tag 100, and the location value field 42 includes a location value corresponding to the NFC tag 100. For example, the location value field 42 includes at least one of a name of a building, a room number, a name of a local place, and a name of a cultural asset, such as room number 503 in Kyobo building, the Dabotap pagoda in the temple of Bulguksa, or Haeundae beach.

Accordingly, the server 300 checks a detailed location of the NFC tag 100 based on the ID of the NFC tag 100, which is received from the device 200, and provides the device 200 with a service related to the checked location. Also, the server 300 may use location information that is stored and matched with the ID of the NFC tag 100, and thus, may provide the service based on the detailed location that is more particular than a GPS value.

Figures 5, 6:
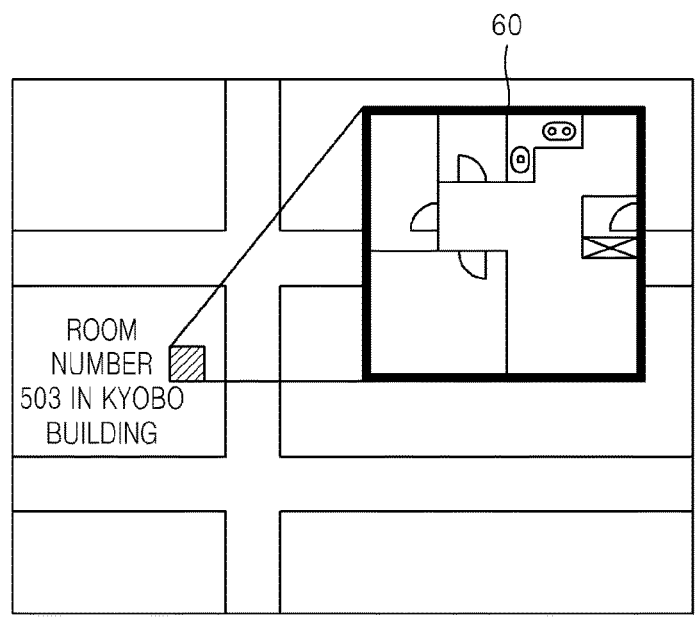
FIG. 5 illustrates an example of a service table according to an embodiment of the present invention.
FIG. 6 illustrates an example of service data that is provided via a map information providing service, according to an embodiment of the present invention.

FIG. 5 illustrates an example of a service table according to an embodiment of the present invention.

Referring to FIG. 5, the service table includes an application field 50 and a service field 52. The application field 50 includes ID values of the applications, and the service field 52 includes a plurality of pieces of information about the services corresponding to the applications. For example, the service field 52 includes ID values of services such as a map information providing service, an album managing service, an image-capturing service, and a memo managing service.

FIG. 6 illustrates an example of service data that is provided via a map information providing service, according to an embodiment of the present invention.

Referring to FIG. 6, the device 200 receives tag information from an NFC tag located in room number 503 in the Kyobo building, provides the tag information to the server 300, and requests the server 300 to provide service data with respect to a map information providing application in the device 200. In this case, the server 300 may recognize that a location of the NFC tag indicates the Kyobo building by referring to the received tag information and may provide the device 200 with a layout view 60 of room number 503 in Kyobo building. Also, as illustrated in FIG. 6, the layout view 60 that is provided to the device 200 may be displayed over part of a map.

FIG. 7 illustrates an example of service data that is provided via a memo management service, according to an embodiment of the present invention.

Referring to FIG. 7, the device 200 receives tag information from an NFC tag arranged at Haeundae beach, provides the tag information to the server 300, and requests the server 300 for service data with respect to a memo application in the device 200. In this case, the server 300 recognizes that a location of the NFC tag indicates Haeundae beach by referring to the received tag information and provides the device 200 with a memo list containing memos input at Haeundae beach. Further, as illustrated in FIG. 7, the memos in the memo list that is provided to the device 200 may be sorted by date and displayed on a screen.

FIG. 8 illustrates an example of service data that is provided via an album management service, according to an embodiment of the present invention.

Referring to FIG. 8, the device 200 receives tag information from an NFC tag arranged at the Dabotap pagoda in the temple of Bulguksa, provides the tag information to the server 300, and requests the server 300 for service data with respect to an album management application in the device 200. In this case, the server 300 recognizes that a location of the NFC tag indicates the Dabotap pagoda in the temple of Bulguksa by referring to the received tag information and provides the device 200 with images that are captured at the Dabotap pagoda in the temple of Bulguksa. Also, as illustrated in FIG. 8, the images that are provided to the device 200 may be sorted by date and displayed on a screen.

FIG. 9 is a signal flow diagram illustrating a method of providing a service by using an NFC tag, according to an embodiment of the present invention.

Referring to FIG. 9, in step S900, the device 200 receives tag information from the NFC tag 100, when the device 200 is within a predetermined range of the NFC tag 100. As described above, the tag information may include at least one of a tag ID and tag location information, and the tag location information may include at least one of an address, a name of a local place, a name of a building, a floor level of a building, and a room number but aspects of the present invention are not limited thereto. Further, the tag location information may include a GPS value of a location of the NFC tag 100. The NFC tag 100 may be attached to a fixed body in a location such as a building, a famous local place, a cultural asset, etc., and the device 200 may receive the tag location information about the location where the NFC tag 100 is located from the NFC tag 100.

In step S902, the device 200 provides the tag information and application information to the server 300. More specifically, in step S902, the device 200 provides the tag information and the application information to the server 300 and requests the server 300 for service data with respect to an application. The device 200 may check the application that is installed and executed in the device 200 and provide information about the checked application to the server 300. For example, the application information includes information about at least one of a title, an ID, a type, and a manufacturer of the application.

In step S904, the server 300 determines a service to be provided to the device 200, according to the application information. More specifically, in step S904, the server 300 distinguishes between applications according to titles or IDs of the applications, and determines services to be provided to the device 200, wherein the services are matched to the distinguished applications, respectively. The server 300 may determine a service to be provided to the device 200, wherein the service provides data to be output by the application. For example, the server 300 determines a service, such as a map providing service, an album service, a memo service, or an image-capturing service, as the service to be provided to the device 200.

In step S906, the server 300 checks a location value of the NFC tag 100 based on the tag information. When the tag information indicates the tag ID, the server 300 checks the location value that is matched with the tag ID. When the tag information includes the location value of the NFC tag 100, the server 300 checks the location value of the NFC tag 100 by referring to the tag information. For example, the location value of the NFC tag 100 includes at least one of an address, a name of a local place, a name of a building, a floor level of a building, and a room number.

In step S908, the server 300 determines service data to be provided to the device 200, according to the checked location value. For example, when an application that is executed in the device 200 provides a map service, the server 300 determines detailed map data as the service data to be provided to the device 200, wherein the detailed map data is within a preset range from a location of the NFC tag 100. As another example, when an application that is executed in the device 200 provides an album service, the server 300 determines image data as the service data to be provided to the device 200, wherein the image data is captured and stored within a preset range from the location of the NFC tag 100. As another example, when an application that is executed in the device 200 provides a memo service, the server 300 determines memo data as the service data to be provided to the device 200, wherein the memo data is written within a preset range from the location of the NFC tag 100.

In step S910, the server 300 provides the determined service data to the device 200.

In step S912, the device 200 outputs the service data, e.g., the device 200 outputs the service data using the application that is executed in the device 200.

In accordance with above-described embodiments of the present invention, it is possible to effectively provide location-based services, using an NFC tag, to check a detailed location of the NFC tag based on tag information that is received from the NFC tag, and to provide different location-based services with respect to a plurality of applications that are installed in the device.

Further, the above-described embodiments of the present invention may be written as computer programs in a computer-readable recording medium, e.g., a program module to be executed in computers, which include computer-readable commands. The computer-readable recording medium may include any usable medium that may be accessed by computers, volatile and non-volatile media, and detachable and non-detachable media. Also, the computer-readable recording medium may include a computer storage medium and a communication medium. The computer-readable recording medium includes all volatile and non-volatile media, and detachable and non-detachable media that are designed to store information including computer-readable commands, data structures, program modules, or other data. The communication medium includes computer-readable commands, a data structure, a program module, and other transmission mechanisms, and includes other information transmission media.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A device which receives one or more services based at least in part on applications installed in the device, comprising:
    a first communication unit which receives tag information from a near field communication (NFC) tag;
    a second communication unit which communicates with a server; and
    a processor configured to:
        in response to detecting an NFC tag within a near field communication range, receive, from the NFC tag via the first communication unit, tag information comprising a location value of the NFC tag;
        check which application is being executed in the device when the NFC tag is detected;
        provide, via the second communication unit, the server with a request for one or more services corresponding to the NFC tag and the checked application being executed in the device, wherein the request comprises the tag information and information regarding the checked application being executed in the device; and
        receive, from the server via the second communication unit, service data for one or more services (i) selected, by the server, based on the tag information and (ii) matched, by the server, to the checked application being executed in the device using a preset service table.

2. The device of claim 1, wherein the tag information comprises a tag IDentification (ID).

3. The device of claim 2, wherein the location value comprises at least one of:
    an address;
    a name of a local place;
    a name of a building;
    a floor level of a building; and
    a room number.

4. The device of claim 1, wherein, when the checked application being executed in the device comprise an application that provides a map service, map data is received from the server, through the second communication unit, and wherein the map data includes information about a detailed map within a preset range from the location value of the NFC tag.

5. The device of claim 1, wherein, when the checked application being executed in the device comprise an application that provides an album service, image data is received from the server, through the second communication unit, and wherein the image data is captured and stored within a preset range from the location value of the NFC tag.

6. The device of claim 1, wherein, when the checked application being executed in the device comprise an application that provides a memo service, memo data is received from the server, through the second communication unit, and wherein the memo data is written within a preset range from the location value of the NFC tag.

7. The device claim 1, wherein, when the checked application being executed in the device comprise an application that provides an image-capturing service, the request provided to the server further comprises an image that is captured by using the application, and
    wherein the location value of the NFC tag and the image are mapped to each other and are stored in the server.

8. The device of claim 1, wherein, when the checked application being executed in the device comprise an application that provides a memo service, the request provided to the server further comprises memo data that is input by using the application, and
    wherein the location value of the NFC tag and the memo data are mapped to each other and are stored in the server.

9. A server for providing a service, comprising:
    a communication unit; and
    a processor which:
        receives, from a device via the communication unit, a request for one or more services comprising tag information the device received from a near field communication (NFC) tag and information regarding an application being executed in the device, the application being checked when the NFC tag is detected by the device, wherein the tag information comprises a location value of the NFC tag;
        selects service data for one or more services to be provided to the device (i) based on the tag information and (ii) matched, by the server, to the checked application being executed on the device using a preset service table; and transmits the service data to the device through the communication unit.

10. The server of claim 9, wherein, when the checked application comprises an application which provides a map service, the service data selected to be provided to the device further comprises map data about a detailed map within a preset range from the location value of the NFC tag.

11. The server of claim 9, wherein, when the checked application comprises an application which provides an album service, the service data selected to be provided to the device further comprises image data that is captured and stored within a preset range from the location value of the NFC tag.

12. The server of claim 9, wherein, when the checked application comprises an application which provides a memo service, the service data selected to be provided to the device further comprises memo data that is written within a preset range from the location value of the NFC tag.

13. The server of claim 9, wherein, when the checked application comprises an application which provides an image-capturing service, the received request further comprises an image that is captured by the device using the application, and wherein the server further comprises:
a database that maps the location value of the NFC tag on the image and stores the location value and the image.

14. The server of claim 9, wherein, when the checked application comprises an application which provides a memo service, the received request further comprises memo data that is input using the application by the device, and wherein the server further comprises:
a database that maps the location value of the NFC tag on the memo data and stores the location value and the memo data.

15. A method for a device to receive one or more services based at least in part on applications currently running in the device, comprising:

in response to detecting a near field communication (NFC) tag within an NFC range, receiving, from the NFC tag, tag information comprising a location value of the NFC tag;

checking which application is being executed in the device when the NFC tag is detected;

transmitting a request for one or more services corresponding to the NFC tag and the checked application being executed in the device, wherein the request comprises the tag information and the information regarding the checked application being executed in the device; and receiving, from a server, service data for one or more services (i) selected, by the server, based on the tag information and (ii) matched, by the server, to the checked application being executed in the device using a preset service table.

16. A method of providing a service, comprising:

receiving, from a device, a request for one or more services comprising tag information the device received from a near field communication (NFC) tag and information regarding an application being executed in the device, the application being checked when the NFC tag is detected by the device, wherein the tag information comprises a location value of the NFC tag;

selecting service data for one or more services to be provided to the device (i) based on the tag information and (ii) matched, by the server, to the checked application being executed in the device using a preset service table; and transmitting the service data to the device.

17. A non-transitory computer-readable recording medium having recorded thereon a program, which when executed, controls a device to perform a method of receiving a service, the method comprising:

in response to detecting a near field communication (NFC tag within a near field communication range, receiving, from the NFC tag, tag information comprising a location value of the NFC tag;

checking which application is being executed in the device when the NFC tag is detected;

transmitting a request for one or more services corresponding to the NFC tag and the checked application being executed in the device, wherein the request comprises the tag information and the information regarding the checked application being executed in the device; and receiving, from a server, service data for one or more services (i) selected, by the server, based on the tag information and (ii) matched, by the server, to the checked application being executed in the device using a preset service table.

* * * * *